United States Patent [19]

Shibata

[11] Patent Number: 5,023,829
[45] Date of Patent: Jun. 11, 1991

[54] DATA TRANSFER SYSTEM HAVING A CHANNEL ADAPTER WITH VARYING DATA TRANSFER LENGTHS

[75] Inventor: Yoshikazu Shibata, Minamiashigara, Japan

[73] Assignee: Hitachi, Ltd., Tokyo, Japan

[21] Appl. No.: 226,277

[22] Filed: Jul. 29, 1988

[30] Foreign Application Priority Data

Sep. 11, 1987 [JP] Japan ................................ 62-226613

[51] Int. Cl.⁵ .............................................. G06F 13/12
[52] U.S. Cl. ................................ 364/900; 364/926.92; 364/927.95; 364/927.97; 364/927; 364/99; 364/929; 364/935.3; 364/935.44; 364/935.54; 364/939.3; 364/952.1; 364/968
[58] Field of Search ........................... 364/200, 900

[56] References Cited

U.S. PATENT DOCUMENTS

| | | | |
|---|---|---|---|
| 3,999,163 | 12/1976 | Levy et al. | 364/200 |
| 4,075,691 | 2/1978 | Davis et al. | 364/200 |
| 4,110,830 | 8/1978 | Krygowski | 364/200 |
| 4,371,929 | 2/1983 | Brann et al. | 364/200 |
| 4,442,485 | 4/1984 | Ota et al. | 364/200 |
| 4,490,784 | 12/1984 | Ives et al. | 364/200 |
| 4,495,564 | 1/1985 | Draper et al. | 364/200 |
| 4,514,823 | 4/1985 | Mendelson et al. | 364/900 |
| 4,527,233 | 7/1985 | Ambrosius, III et al. | 364/200 |
| 4,538,224 | 8/1985 | Peterson | 364/200 |
| 4,583,163 | 4/1986 | Kobayashi et al. | 364/200 |
| 4,584,719 | 4/1986 | Miller | 364/900 |
| 4,631,671 | 12/1986 | Kawashita et al. | 364/200 |
| 4,712,176 | 12/1987 | Fredericks et al. | 364/200 |
| 4,722,051 | 1/1988 | Chattopadhya | 364/200 |

FOREIGN PATENT DOCUMENTS

61-187057 8/1985 Japan .

OTHER PUBLICATIONS

Lynch et al., "Serial Channel to I/O Interface", IBM Technical Disclosure Bulletin, vol. 19, No. 8, pp. 3139-3143, (Jan. 1977).
"IBM System/360 and System/370 I/O Interface Channel to Control Unit Original Equipment Manufacture's Information", (Feb. 1988).

Primary Examiner—Gareth D. Shaw
Assistant Examiner—Matthew C. Fagan
Attorney, Agent, or Firm—Kenyon & Kenyon

[57] ABSTRACT

A data transfer system to transfer variable-length data from a channel unit to a peripheral storing medium in which a channel adapter and a storing medium control unit are disposed between a channel unit and a data storing medium. These components are linked by means of a signal transmission path. The channel unit transmits a data signal and a command signal including an instruction designating a storage of the data and information specifying a length of the data to the storing medium control unit. On receiving the command signal from the channel unit, the storing medium control unit supplies the information specifying the length of the data in the command signal to a count unit of the channel adapter. The information is then set to the count unit of the channel adapter. When the setting operation is completed, the channel adapter requests the channel unit for the data, which causes the data having the length of the data thus set to be transferred from the channel unit (to the channel adapter), thereby temporarily storing the data transferred. The storing medium control unit reads out the data stored in the channel adapter and temporarily stores the data so as to transfer the data to the data storing medium.

4 Claims, 2 Drawing Sheets

DATA TRANSFER SYSTEM HAVING A CHANNEL ADAPTER WITH VARYING DATA TRANSFER LENGTHS

BACKGROUND OF THE INVENTION

The present invention relates to a data transfer system achieving a transfer of data having a variable length between a channel apparatus or unit and a storage medium apparatus such as a magnetic disk device, and in particular, to a data transfer system having a channel adapter capable of effecting an efficient data transfer also in a case where the length of a signal cable is elongated between the channel apparatus and the magnetic disk device.

In the JP-A-61-187057 filed on Sept. 18, 1985 with the priority based on the U.S. Ser. No. 700,355 filed by Fredericks et al. on Feb. 11, 1985 or in the "IBM Technical Disclosure Bulletin", Vol. 19, No. 8, January 1977, pp. 3139-3143, there has been proposed a channel adapter using an optical transfer technology in order to effect a data transfer through a long distance by elongating the length of a transfer cable between a channel apparatus and a magnetic disk device (a kind of peripheral storage device).

According to the system described in the literature cited above, between the channel apparatus or device and the magnetic disk device, there are disposed a channel adapter A on the channel device side and a channel adapter B and a magnetic disk controller on the magnetic disk side and these units are linked by use of signal cables. Particularly, the channel adapters A and B are connected to each other with an optical cable advantageous for a long-distance transmission because the signal attenuation and the effect of noise are considerably reduced as compared with the metal conductors. The channel adapters A and B are capable of effecting a conversion of a plurality of electric signals arranged in the parallel fashion into optical signals ordered in the bit serial manner so as to match the transmission format in the optical cable and vice versa. For the connecting cables between the channel adapter and the channel device as well as the magnetic disk controller, there can be employed a standard input interface described in the "IBM System/360 and System/370 Interface Channel to Control Unit Original Equipment Manufactures' Information".

In the system above, in order to write data having a variable length in a magnetic disk device, the data is transferred from the channel unit to the magnetic disk device as follows.

First, a write command, Channel Command Word (CCW) specifying the data length and data address of data to be transferred from the channel unit to the magnetic disk control unit is sent from the channel unit to the magnetic disk control unit. The magnetic disk unit then separately examines the track and sector position of the magnetic disk device in which the transferred data is to be written and the allowable data length thereof and then issues a request for the data via the channel adapters B and A to the channel unit. The magnetic disk controller, prior to a write operation of the data in the magnetic disk device, stores the data received from the channel unit in a temporary buffer memory for the following reason. In a case where there exists a very long connection length, for example, several hundred meters, between the channel unit and the magnetic disk controller, even if a data request is issued to the channel unit at a point of time when the recording head matches with the first recording position of the rotating magnetic disk, the data is not immediately transferred to the magnetic disk unit. There is a considerable delay of the response time that elapses from when the data request from the magnetic disk device reaches the channel unit and when data sent from the channel unit, after the request is decoded, arrives at the magnetic disk unit. As a consequence, during the period of the delay, since the magnetic disk is rotating, there arises an unused space on the track. In order to avoid the problem of the response delay time taking place in the long-distance transmission path, data with a capacity which can be written on the magnetic disk is transferred during the delay time of the transmission path from the channel device to the buffer memory of the magnetic disk controller so as to be temporarily stored therein. Since the magnetic disk controller is adjacent to the magnetic disk device or is located in a position relatively in the neighborhood of the magnetic disk device, the period of the signal transmission time therebetween is negligible, and hence when the magnetic disk issues a data transfer request to the magnetic disk controller, the data is almost instantaneously transferred therefrom to the magnetic disk device and is then recorded in a track of the disk.

However, in the system above, when the transmission route between the channel unit and the magnetic disk controller is elongated, the capacity of the buffer memory of the magnetic disk controller is naturally required to be increased. That is, in a system having different transmission routes, the capacity of the respective buffer memory varies; consequently, the compatibility of the magnetic disk units cannot be sustained, and a considerably great amount of buffer memory is necessary when the transmission route becomes long, which leads to a disadvantage with respect to system cost.

In order to solve the above problem, there has been proposed a system in which a buffer memory is also disposed in the channel adapter on the side of the magnetic disk controller. In this system, on receiving a write command CCW from the channel unit, the channel adapter B requests the channel unit to transfer data corresponding to the capacity of the data buffer without waiting for the data transfer request from the magnetic disk controller so as to store the data in the data buffer. When a transfer request from the magnetic disk controller is received, the channel adapter B transfers the data stored in the buffer memory thereof to the buffer memory of the magnetic disk controller. Each time the data is entirely outputted from the buffer memory, the channel adapter B issues a data transfer request to the channel unit thereby storing the data corresponding to the capacity of the data buffer memory. The signal path between the channel adapter B and the magnetic disk controller is short and the period of delay time associated with the response time to be elapsed from when the data transfer request from the magnetic disk controller is received to when the data is transferred is negligible.

In this system, the channel adapter B requests the channel unit to transfer data corresponding to the capacity of the buffer memory thereof. In consequence, when the data length requested by the magnetic disk device is smaller than that requested by the channel adapter B, the channel unit assumes the requested length to be an incorrect length and hence a software error is assumed so as to terminate the data transfer processing with an abnormal termination. In a case of a fixed data length, the capacity of the buffer memory of the channel adapter B need only be fixed to the predetermined data length; however, in a system in which variable-length data is to be transferred, it cannot be avoided that the abnormal termination disadvantageously takes place.

SUMMARY OF THE INVENTION

It is therefore an object of the present invention to solve the above problem above and to provide a data transfer system in which when transferring variable-length data between a channel unit and a data storing medium such as a magnetic disk device via a long-distance transmission path, the data transfer can be achieved without increasing the capacity of the data buffer in the recording medium control unit and without detecting an invalid data length error.

In order to achieve the above object above, the data transfer system according to the present invention includes a data buffer in a channel adapter for temporarily storing variable-length data transferred from a data sending side and means for recognizing a data length of data to be transferred from the channel adapter, namely, means for storing information representing the length of data to be transferred (data length information). Prior to a data transfer, the channel adapter obtains data length information from the control unit and memorizes the attained data length information so as to issue a data request to the data sending side for data of which the data length corresponds to the stored data length, thereby storing data from the data sending side in the data buffer of the channel adapter. In this case, the operation is effected such that the data length issued to the channel unit does not exceed the data length stored in the channel adapter. As a result, for a data request from the control unit, there does not appear a condition that a write operation of the data at the predetermined position is prevented due to a delay of the data transfer caused by a delay on the transmission path; in addition, there does not exist any fear that an invalid data length error is detected by the data sending side, thereby enabling the normal operation to be achieved.

BRIEF DESCRIPTION OF THE DRAWINGS

The present invention will be apparent from the following detailed description taken in conjunction with the accompanying drawings in which.

DETAILED DESCRIPTION OF THE PRESENT INVENTION

Figure 1:
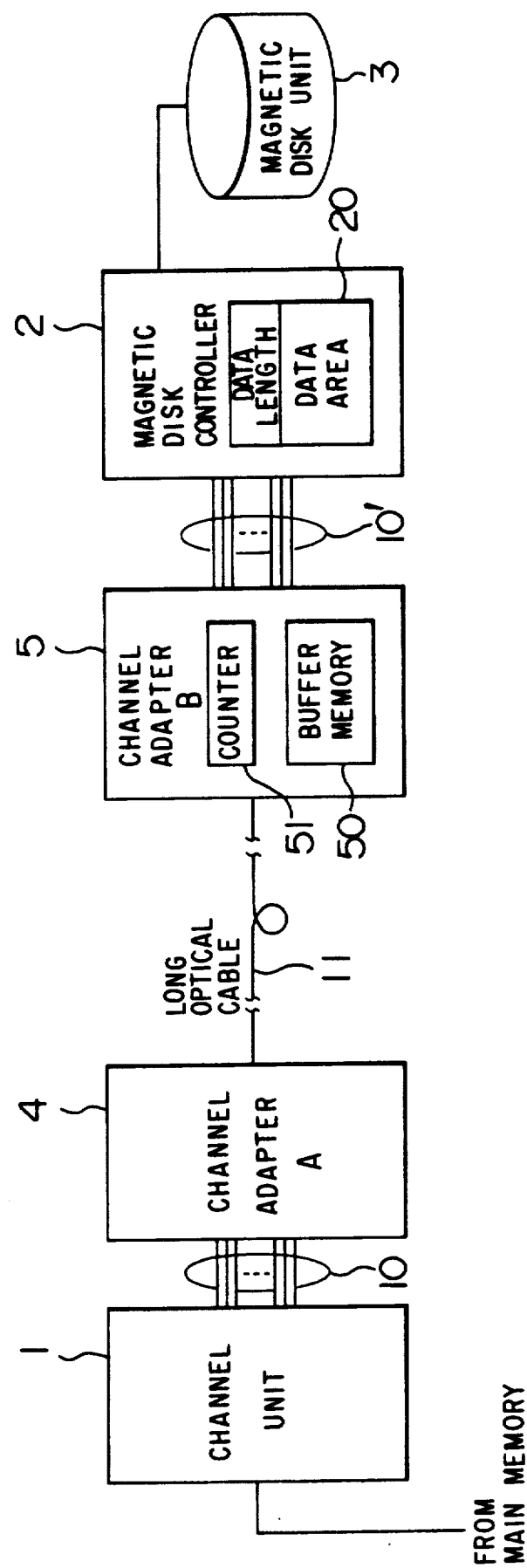
FIG. 1 is a block diagram schematically showing the overall constitution of an embodiment of a data transfer system according to the present invention.

FIG. 1 shows the overall configuration of an embodiment of a data transfer system according to the present invention. In this embodiment, a magnetic disk device is employed as the storing medium and the data is transferred in the direction of the magnetic disk. The system of FIG. 1 comprises a channel apparatus or unit 1, a magnetic disk controller (storing medium control unit) 2, a magnetic disk unit 3, a channel adapter A 4 on the side of the channel unit 1, a channel adapter B 5 on the side of the magnetic disk controller 2, interfaces 10 and 10' respectively establishing connections between the channel unit 1 and the channel adapter A 4 and between the channel adapter B 5 and the magnetic disk controller 2, and an optical cable 11 for transmitting optical signals through a long distance. The channel adapters A 4 and B 5 each have functions to convert a plurality of electric signals arranged in the parallel relationship into optical signals formed in the bit serial fashion suitable for the transmission format of the transmission through the optical cable and vice versa. For the connecting cables between the channel adapter and the channel unit as well as the magnetic disk controller, there is adopted a standard input interface described above. In consequence, the channel unit 1 and the magnetic disk controller 2 can be regarded as equivalent to a system directly linked by use of the interface. Since the channel adapter A 4 is located in the channel unit 1 in an ordinary case, it may be considered that the channel unit 1 includes the function of the channel adapter A 4 and the channel adapter A 4 is omitted. In addition, the channel adapter B 5 can be located in the magnetic disk controller 2 or in the vicinity thereof.

Incidentally, the magnetic disk control unit 2 includes a buffer memory 20 having an area for temporarily storing data transferred from the channel adapter 5 and an area for storing the data length of the data stored. In addition, the channel adapter 5 comprises a byte counter 51 for storing therein the data length of data for which the transfer request is issued to the channel unit 1 and a buffer memory 50 for temporarily storing data transferred from the channel unit 1.

Referring next to FIG. 1, description will be given of the operation for transferring variable-length data from a main memory (not shown) to the magnetic disk device 3.

The channel unit 1 first supplies a sequence of input/output commands to the magnetic disk device 2. The input/output commands include a seek command to move the magnetic head to a position over a track of the magnetic disk in which the transferred data is to be written, a set sector search command to locate the magnetic head at the first position of a record in the track, a write command to designate a write instruction of data transferred from the main memory, and the like. The write command further includes a command code identifying the write command, a data address, and a data length (number of bytes).

The commands are delivered to the magnetic disk control unit 2 through the interface 10, the channel adapter A 4, the long-distance optical cable 11, and the channel adapter B 5. In response to the commands thus received, the magnetic disk control unit 2 decodes information (data byte count) related to the data length in the write command, stores the data length in an area where the data length is to be recorded in the buffer memory 20, causes the magnetic head to initiate a search operation for the magnetic disk device 3, and then issues a signal notifying the data length to the channel adapter B 5. In response to the data length signal from the magnetic disk control unit 2, the channel adapter B 5 reads the number of bytes of the data length from the buffer memory 20 in the magnetic disk control unit 2 and sets the obtained value to the counter 51. Thereafter, the channel adapter B 5 issues a request for the transfer data to be transferred to the magnetic disk to the channel unit 1 via the optical cable 11 and the channel adapter A 4. The data transfer request is effected in the unit of bytes. In consequence, for each data request to the channel unit 1, the channel adapter B 5 decrements the data length byte count of the counter 51. The data request is issued to the channel unit 1 until the value of the counter 51 becomes to be zero, thereby storing the data received in response to the requests in the buffer memory 50. Namely, in consequence, the buffer memory 50 of the channel adapter B 5 is loaded with data having a data length identical to the data length recorded in the buffer memory of the magnetic disk control unit 2. That is, regardless of the length of the transfer data, the channel adapter B 5 requests the channel unit 1 in any case to send data having the data length contained in the write command, and hence there does not occur an incorrect length error.

Next, when a certain period of time is elapsed (i.e. a period of time when the channel adapter B 5 is receiving the transferred data from the channel unit 1) after the data length is notified from the magnetic disk control unit 2 to the channel adapter B 5, the magnetic disk control unit 2 issues a data transfer request in the unit of bytes to the channel adapter B 5. In response to the data transfer request, the channel adapter B 5 transfers the data stored in the buffer memory 50 thereof to the data area of the buffer memory 20 of the magnetic disk control unit 2. The data temporarily stored in the buffer memory 20 of the magnetic disk control unit 2 is transferred in response to a data request from the magnetic disk device 3. Since the transmission distance of the interface 10' and the distance between the magnetic disk control unit 2 and the magnetic disk device 3 are both short, a response delay in the data transfer in response to the data transfer request does not substantially take place.

Figure 2:
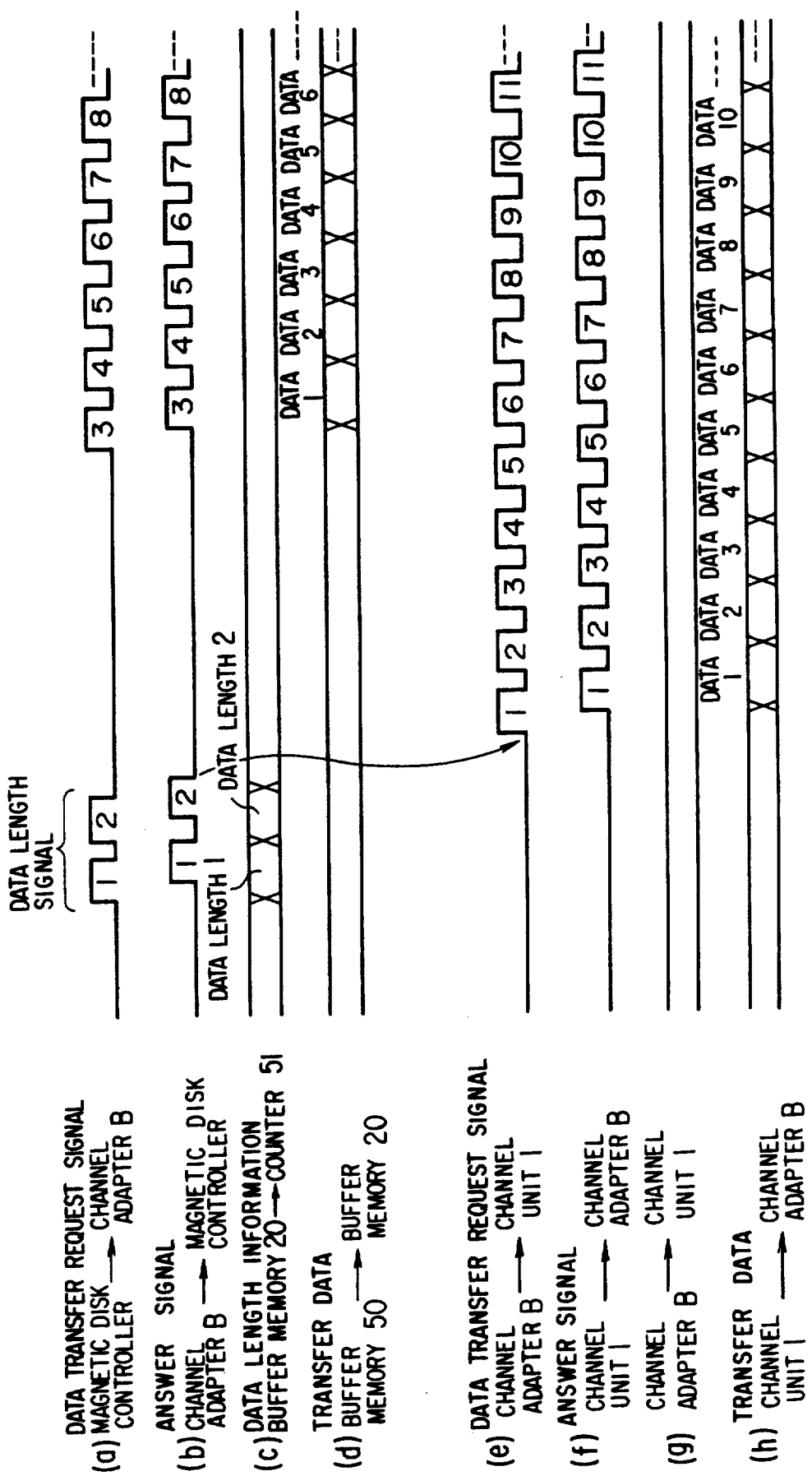
FIG. 2 is a timing chart useful to explain a data transfer operation of the system of FIG. 1.

Next, referring to the signal timing chart of FIG. 2, the operations described above will be concretely described.

The signal (a) is a data transfer request signal outputted from the magnetic disk controller 2 to the channel adapter B 5. In the data request signal (a), two leading bytes constitute a data length signal notifying the length of the data, whereas the third and subsequent bytes configure a signal for an actual data request. During a period of the blank between the data length signal and the data request signal, the channel adapter B 5 requests the channel unit 1 to transfer data so as to temporarily store the data in the buffer memory. In this embodiment, the data length signal is of two bytes because the portion defining the data length in the write command is assumed to comprise two bytes, which does not however restrict the present invention. The signal (b) is an answer signal transmitted from the channel adapter B 5 to the magnetic disk control unit 2 and indicates that a reply is being sent to the magnetic disk control unit 2 in response to the data transfer request signal (a). The signal (c) indicates the data length of data transmitted in response to the data length signal (two first bytes of the signal (a)) from the buffer memory 20 of the magnetic disk control unit 2 to the counter 51 of the channel adapter B 5. After transmitting the answer signal (b), the channel adapter B 5 sends a data request signal (e) in the unit of bytes to the channel unit 1. Actually, the channel adapter B 5 transmits the data request signal to the channel adapter A 4, which then issues the request signal (e) to the channel unit 1; however, in order to simplify the description, the operation of the channel adapter A 4 is omitted. In response to the data request signal (e) from the channel adapter B 5, the channel unit 1 sends an answer signal (f) to the channel adapter B 5, and during this period of time, data (h) having a data length (e) requested by the channel adapter B 5 is transferred to the buffer memory 50 of the channel adapter B 5. Thereafter, at a predetermined timing, the magnetic disk control unit 2 supplies a data transfer request (the third and subsequent bytes of the signal (a)) to the channel adapter B 5. In response thereto, the channel adapter B 5 sends the answer signal (the third and subsequent bytes of the signal (b)) to the magnetic disk control unit 2, and during this period of time, the data (d) stored in the buffer memory 50 is transferred to the buffer memory 20 of the magnetic disk control unit 2. When the magnetic head of the magnetic disk device 3 reaches the first position of the predetermined record, the magnetic disk control unit 2 transfers the data stored in the buffer memory 20 to the magnetic disk device 3. Through the procedure described above, the data from the channel unit 1 is transferred to the magnetic disk device 3 without causing the response delay and the data length error. The signal (g) represents data signal when the data is transferred from the channel adapter B 5 to the channel unit 1. This signal does not present in the present embodiment.

Incidentally, while the invention has been described with reference to the embodiment in which a magnetic disk device is employed as the data storing medium, it is not restricted by this embodiment, namely, the present invention can be applied to the data transfer to various peripheral storage devices such as a magnetic tape, an optical disk, and a magnetic drum. Furthermore, in FIG. 1, a set of the magnetic disk controller 2 and the magnetic disk device 3 is connected to the channel adapter B 5; however, in ordinary cases, a plurality of sets of the magnetic disk controller 2 and the magnetic disk device 3 are connected thereto. It is to be appreciated that the data transfer system according to the present invention is naturally applicable to such cases. The above description explains about the case where data is transferred from the channel unit 1 to the data storing medium 3. However, the present invention also can be applied to another case where the data is transferred from the data storing medium 3 to the channel unit 1. In this case, a counter and a data buffer memory are also provided in the channel adapter A 4 disposed adjacent to the channel unit 1.

I claim:

1. In a data transfer system for transferring data between a data producing unit and a data storing medium, wherein an adapter unit is connected between said data producing unit and a storing medium control unit and said storing medium control unit is connected to said data storing medium, a data transfer method comprising the steps of:

transmitting a command signal from said data producing unit, said command signal including an instruction portion designating an operation of storing data and an information portion specifying a length of said data;

receiving said command signal transmitted by said data producing unit at said storing medium control unit, said storing medium control unit then supplying the length of said data from said information portion of the command signal to said adapter unit;

storing the length of said data in said adapter unit;

requesting a transfer of data of said data producing unit by said adapter unit, said requested data having a length the same as the length stored in said adapter unit;

transferring said requested data from said data producing unit to said adapter unit in response to the requesting of a transfer of data;

storing said transferred data in said adapter unit;

reading out the data stored in said adapter unit under command of said storing medium control unit;

storing the data read out of said adapter unit in said storing medium control unit; and transferring the data stored in the storing medium control unit to the data storing medium.

2. In a data transfer system for transferring data between a channel unit and a data storing medium, wherein a channel adapter is connected between said channel unit and a storing medium control unit and said storing medium control unit is connected to said data storing medium, a data transfer method comprising the steps of:

transmitting a command signal from said channel unit, said command signal including an instruction portion designating an operation of storing data and an information portion specifying a length of said data;

receiving said command signal transmitted by said channel unit at said storing medium control unit, said storing medium control unit then supplying the length of said data from said information portion of the command signal to said channel adapter;

storing the length of said data in said channel adapter;

requesting a transfer of data from said channel unit by said channel adapter, said requested data having a length the same as the length stored in said channel adapter;

transferring said requested data from said channel unit to said channel adapter in response to the requesting of a transfer of data;

storing said transferred data in said channel adapter;

reading out the data stored in said channel adapter under command of said storing medium control unit;

storing the data read out of said channel adapter in said storing medium control unit; and transferring the data stored in the storing medium control unit to the data storing medium.

3. A data transfer system comprising:

first means for generating a command signal and data, said command signal including an instruction portion indicating a transferring of said data and an information portion specifying a length of said data;

second means for transferring said command signal and said data from said first means;

an adapter unit, connected to said first means by said second means, said adapter unit including a counter and a first storage area;

a control unit, connected to said adapter unit and to a data storage medium, said control unit receiving said command signal from said first means via said second means and said adapter unit, and in response thereto, supplying the length of said data from said information portion of said command signal to said counter in said adapter unit;

said adapter unit, in response to the supplying of the length of said data from said control unit, requesting said first means to transfer said data to said adapter unit;

said first means, in response to the requesting by the adapter unit to transfer said data, transferring said data to said adapter unit via said second means, said adapter unit storing said data in said first storage area, wherein said transferred data has a length the same as said data length loaded in said counter; and said control unit requesting a transfer of said data stored in said first storage area to said second storage area;

said adapter unit, in response to the requesting by the control unit, transferring said data from said first storage area to said second storage area; and said control unit subsequently transferring said data stored in said second storage area to said data storing medium.

4. A data transfer system according to claim 3, wherein:

said first means generates said data in a form of electrical signals arranged in a parallel fashion and includes a first adapter for converting said electrical signals into optical signals arranged in a bit serial fashion and for transmitting said optical signals to said second means;

said second means is an optical cable for transferring said optical signals; and said adapter unit further includes a second adapter for receiving said optical signals from said second means and for converting said optical signals into electrical signals arranged in a parallel fashion.

* * * * *